March 30, 1965   W. J. CONERY   3,176,095
CONTROL SWITCH HAVING ISOLATED FLUID ACTUATOR
Filed Oct. 8, 1962

*INVENTOR.*
WILLIAM J. CONERY
BY *Oldham & Oldham*
ATTYS.

United States Patent Office 3,176,095
Patented Mar. 30, 1965

3,176,095
CONTROL SWITCH HAVING ISOLATED
FLUID ACTUATOR
William J. Conery, Ashland, Ohio, assignor to Hydr-O-Matic Pump Company, Hayesville, Ashland, Ohio, a corporation of Ohio
Filed Oct. 8, 1962, Ser. No. 228,819
5 Claims. (Cl. 200—83)

The present invention relates to control switches for electrically driven sump pumps, or the like, and particularly to combinations of control switches with electrically driven sump pumps or the like, the control switch having an isolated liquid actuator provided therein in an internal compartment thereof.

The present invention relates to sump pumps, or the like, and conventional sump pumps as made today usually include an electrically driven pump that is permanently positioned at the bottom of a sump, bilge, or other container wherein a variable quantity of liquid is received and stored at various times. The apparatus in the sump or bilge is automatically controlled so that the electrically driven pump will operate at desired times for reducing the level of liquid received in the sump so as to maintain the maximum and minimum levels thereof at desired values.

In these sump pumps and controls, normally the controls for the sump pump are completely immersed in the liquid in which the sump pump is positioned. The electrical controls for sump pumps usually include some type of a pressure actuated switch that is in operative engagement or association with the liquid in the sump to open and close the control circuit for the electrically driven pump to actuate it upon predetermined pressure conditions dependent upon the level of liquids received in the sump container.

The general object of the present invention is to provide a novel and improved control switch of the class described characterized by the isolation of a pressure chamber within the control switch from the liquid body in which the control switch is submerged for pump control action.

Another object of the invention is to provide a control switch of the class described where a pressure control switch is positioned within a housing and where a pressure chamber provided within this switch is connected to the pressure receiving diaphragm forming a portion of the enclosure by a body of oil to isolate the pressure switch from the liquid in which the enclosure is submerged.

Another object of the invention is to use an oil lighter than water in a control switch normally immersed in a water body for control action of the level of liquid in a unit such as a sump and where such oil is provided in a downwardly facing receptacle or chamber formed within the enclosure and partially defined by a flexible diaphragm one face of which is in contact with the liquid in the sump and with the oil forming a communication between the flexible diaphragm and the pressure of the liquid in the sump thereon with the pressure control switch.

Another object of the invention is to provide an improved pressure control switch for use with sump pumps and the like and where the control switch is adapted to provide a long service life with a minimum of maintenance thereon and where the switch has an integral flexible pressure receiving member communicating with the switch through a body of uncompressible liquid.

The foregoing and other objects and advantages of the invention will be made more apparent as the specification proceeds.

Attention now is particularly directed to the accompanying drawings where:

When referring to corresponding members shown in the drawings and referred to in the specification, corresponding numerals are used to facilitate comparison therebetween.

Figures 1, 2:
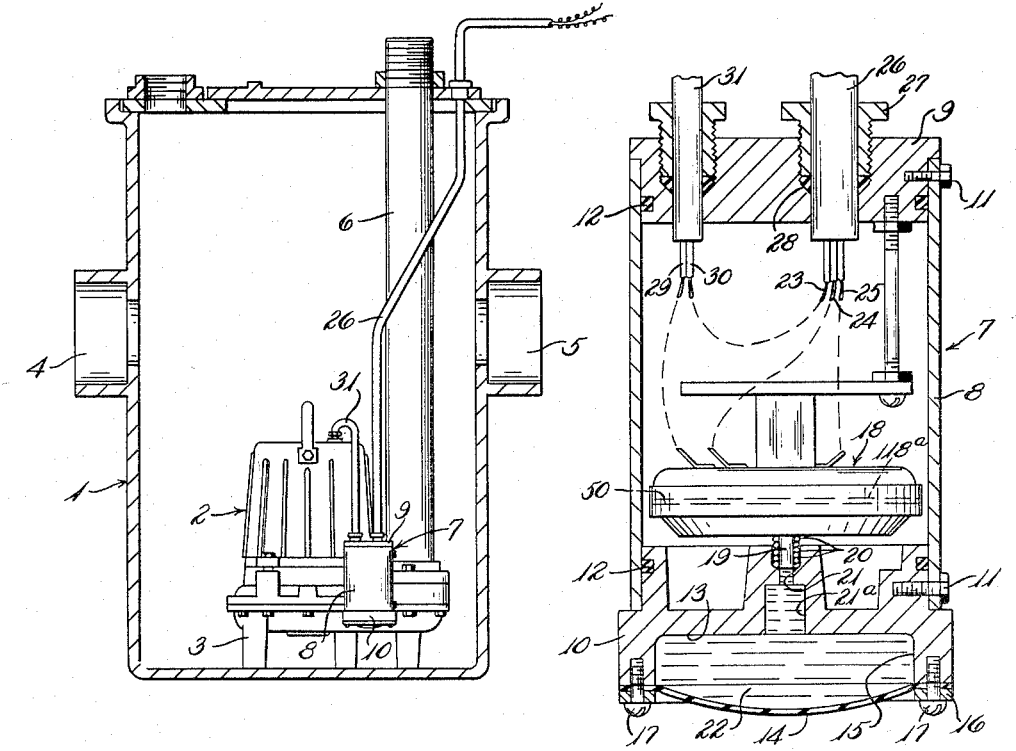
FIG. 1 is a vertical section through a sump having a conventional sump pump and novel control means embodying the principles of the invention operatively associated therewith.
FIG. 2 is an enlarged vertical section through one embodiment of the control switch of the invention.

Generally speaking, the present invention relates to the combination in a control for an electrically driven sump pump or the like of a housing having a bottom portion with a downwardly open recess therein within the margins of the housing, a pressure actuated switch unit operatively positioned within the housing and including a pressure chamber for receiving switch actuating pressure therein, lead means extending through the housing in sealed relation thereto and connecting to the switch unit, an oil impervious flexible diaphragm secured to the housing and covering the recess to form a compartment therewith, and means connecting the pressure chamber to the recess, the compartment and said means being at least substantially completely filled with oil whereby the pressure of a body of liquid in which the housing is immersed can be transmitted to the switch unit through the oil in the housing assembly.

The present invention will be best understood by reference to the details of the structure shown in the drawing, and an enclosure, such as a sump 1 is shown that has a conventional electrically driven sump pump indicated as a whole by the numeral 2, suitably positioned therein, as by being secured to a support or bracket 3. Inlets 4 and 5 are provided by which liquid can flow into the sump 1 from a supply source, and a discharge pipe 6 is connected to the sump pump 2 to discharge liquid from the sump 1 when the sump pump 2 is driven.

It is a feature of the invention that a novel pressure actuated control 7 is provided for actuating the sump pump 2 to determine the liquid levels within the sump 1 that will automatically start the sump pump 2 into operation and then will terminate operation of the sump pump 2 when the liquid level in the sump 1 has been reduced to a desired minimum by the pressures of liquid in the sump. This control 7, as indicated in FIG. 2, includes a cylindrical housing 8 which is shown in this instance as having a top cap or plug 9 removably secured thereto and a bottom cap or plug 10 removably secured thereto, as by means of cap screws 11. These top and bottom caps 9 and 10 are sealed to the housing 8, as by means of conventional O-rings 12. It is an important feature of the invention that this bottom cap 10 is provided with a downwardly facing recess 13 within the margins thereof. This recess 13 in this instance is circular in shape and it has an oil impervious diaphragm 14 secured over or extending across the recess 13 at the lower end thereof so as to form a chamber, or compartment 15 with the marginal portions of the recess 13. The diaphragm 14 is suitably secured to the bottom cap 10, as by means of an annular retaining ring 16 affixed to the bottom cap by screws 17. The diaphragm 14 thus forms one marginal portion of the housing 8 and it is immersed within the body of liquid in which the sump pump 2 is positioned so that the pressure of such liquid in the sump is applied to the diaphragm 14 for control actions and operation of the sump pump 2, as hereinafter described in more detail.

The housing 8 has a conventional pressure actuated switch unit 18 operatively positioned therein. The switch unit 18 has a pressure compartment 50 formed therein between a flexible diaphragm 118a and the adjacent portion of a hollow frame or shell of the switch unit. The pressure compartment 50 has means extending therefrom or connecting thereto, such as a tube 19, so as to enable the control pressure for the switch unit 18 to be transmitted thereto from the associated control means in the housing 8. In this instance, the tube 18 is shown in sealed engagement with an upper portion of the bottom cap 10 by means of a plurality of O-rings 20 that engage the tube and secure the switch unit 18 in position in the enclosure or housing 8. The bottom cap 10 also has a center bore 21 provided therein with a counterbored enlarged end 21a provided at the lower part of this bore 21 to connect to the recess 13 so that the chamber 15 is operatively connected to the pressure receiving chamber 50 within the switch unit 18. It is an important feature of the present invention that an uncompressible liquid, preferably oil 22, is received within the chamber, or compartment 15 and completely fills such chamber and the bore 21 and counterbored end 21a thereof and it extends to the switch unit 18 and completely fills the pressure chamber 50 provided therein. By the construction of the invention, the pressure of the liquid body in which the control 7 is positioned is thus continually applied to one face of the diaphragm 14 and is applied to the body of oil 22 by the diaphragm to be transmited by it automatically to the switch unit 18 for control action therein. At the same time, such switch unit 18 is isolated from any and all contact with the body of liquid in which the control 7 is immersed. This facilitates the provision of a control 7 which will have very good operating characteristics over a long service life even though the control 7 is completely immersed in a body of liquid and may have extreme moisture conditions present in all areas surrounding such unit 18 without any interference with the desired switch and control action. The control 7 also eliminates plugging of the tube or switch orifice 19 by solids or dirt from the liquid material being controlled.

In order to complete the control 7, usually a plurality of electrical power leads indicated at 23, 24 and 25 are present in an electrical power supply cable 26 that extends through the top cap 9 in sealed engagement therewith. The cable 26 may be sealed to the housing 8, and particularly the top cap 9 thereof, by means such as a tubular gland 27 that forces a suitable packing 28 into tight peripheral engagement with the cable 26. These leads 23 through 25 connect to the control switch unit 18 in any conventional manner whereas a pair of additional control leads 29 and 30 also connect and are controlled through the switch unit 18. Such leads 29 and 30 extend through a cable 31 to the sump pump 2 for transmitting power thereto for pump actuation when the applied pressure closes the switch in the switch unit. A sealed connection is provided between the cable 31 and the top cap 9 by conventional means.

From the foregoing, it will be seen that the body of oil 22 is trapped in the bottom portion of the control 7 and that it forms an insulating body that isolates the control switch unit 18 from the liquid in which the housing 8 is immersed. As such oil is lighter in weight than the liquid, it will remain in position even should the diaphragm 14 be punctured, or otherwise fail when in use and isolate the switch from the liquid.

Figure 3:
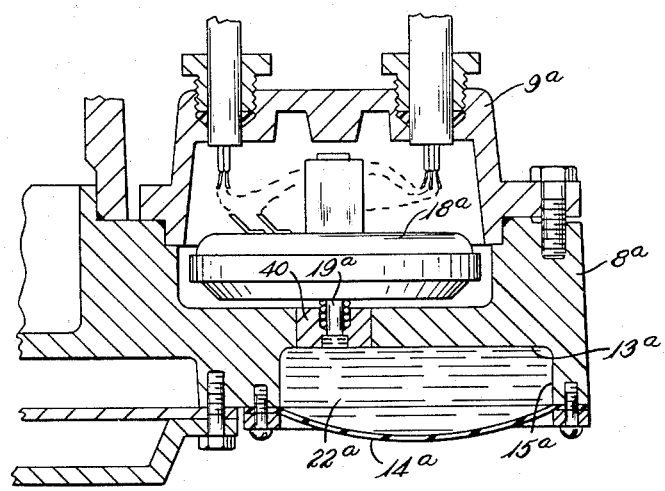
FIG. 3 is a fragmentary vertical section, like FIG. 2, of a modified embodiment of the control switch of the invention.

FIG. 3 shows a modified embodiment of the invention where a housing 8a is provided that has a removable top cap 9a provided therein but with the remainder of the housing forming an integral compartment in which a switch unit 18a of the invention is positioned. This housing 8a in this instance has a circular recess 13a provided in the bottom portion thereof and forming a pressure receiving chamber 15a by means of an oil impervious diaphragm 14a secured in position, as in the other embodiment of the invention described in detail hereinbefore. Again, any suitable means such as a connection block 40 is provided to transmit pressures from the chamber 15a to the tube 19a extending from the pressure receiving compartment provided within the switch unit 18a, but yet to isolate such switch unit from the liquid in which the control of the invention is immersed by a body of oil 22a in the compartment 15a and block 40. It will be realized that the housing 8a can be suitably attached to, or form a portion of any desired type of a support means provided for the sump pump unit of the invention. Likewise, the housing 8 or control 7 of the invention can be attached to the sump pump or support 3 in any conventional manner.

The switch units 18 and 18a, or the enclosures in which they are received, may be vented to the atmosphere in any desired manner, which venting connects to the switch units on the opposite face of the diaphragm 118a, for example, than the tube 19 and the pressure chamber connecting thereto.

The compartments 13 and 13a and means connecting them to the compartment 50, or the like, in the switch unit, are completely or at least substantially filled with oil. A small volume of residual trapped air is difficult to eliminate and doesn't interfere with the functioning of the control.

By the apparatus of the invention, a new and improved type of a control for an electrically driven sump pump or the like has been provided. This new control has insulating liquid separating the electrical switch and compartments thereof from the body of liquid in which the control switch unit is immersed to aid in preventing any possible seepage of moisture into operative portions of the control switch. Hence it is believed that the objects of the inveniton have been achieved.

While two complete embodiments of the invention have been disclosed herein, it will be appreciated that modification of these particular embodiments of the invention may be resorted to without departing from the scope of the invention as defined in the appended claims.

What I claim is:

1. In combination in a control for an electrically driven sump pump, or the like,
  a housing having a bottom portion with a downwardly open recess therein,
  a pressure actuated switch unit positioned within said housing and including a pressure chamber having a tube for receiving switch actuating pressure extending therefrom,
  lead means extending through said housing in sealed relation thereto and connecting to said switch unit,
  an oil impervious flexible diaphragm secured to said housing and extending over said recess to form a compartment therewith, and
  means forming a sealed connection between said compartment and said tube,
  said compartment and tube being completely or at least substantially filled with oil that extends to and at least substantially fills said pressure chamber whereby the pressures of a body of liquid in which said housing is immersed is transmitted to said switch unit that is isolated from such body of liquid, said oil being lighter in weight than said liquid is retained in said compartment even upon failure of said diaphragm.

2. In combination in a control for an electrically driven sump pump, or the like,
  a housing having a bottom portion with a recess therein,
  a pressure actuated switch unit positioned within said housing and including a pressure chamber having a member operatively connected thereto for receiving switch actuating pressure,
  lead means extending through said housing in sealed relation thereto and connecting to said switch unit, an oil impervious flexible diaphragm secured to said housing and enclosing said recess to form a compartment therewith, and means forming a connection between said compartment and said member, said compartment, pressure chamber, and means being completely filled with liquid oil whereby the pressure of a body of liquid in which said housing is immersed is transmitted to said switch unit that is isolated from such body of liquid.

3. In combination in a control for an electrically driven sump pump, or the like, which control is adapted to be immersed in a liquid to be pumped, a housing having a bottom portion with a downwardly open recess therein within the margins thereof, said housing bottom portion having a bore connecting to said recess, a pressure actuated switch unit positioned within said housing and including a pressure chamber having a tube for receiving switch actuating pressure extending therefrom into said bore, lead means extending through said housing in sealed relation thereto and connecting to said switch unit, an oil impervious flexible diaphragm secured to said housing and extending across said recess to form a compartment therewith, and means sealing said tube to said housing bore, said compartment and tube being at least substantially completely filled with liquid oil that extends to and substantially fills said pressure chamber, said oil being lighter in weight than said liquid is retained in said compartment even upon failure of said diaphragm.

4. In combination in a control for an electrically driven sump pump, or the like, a housing having a bottom portion with a downwardly open recess therein, a pressure actuated switch unit positioned within said housing and including a pressure chamber for receiving switch actuating pressure, lead means extending through said housing in sealed relation thereto and connecting to said switch unit, an oil impervious flexible diaphragm secured to said housing and covering said recess to form a compartment therewith, and means connecting said pressure chamber to said recess, said compartment and means being at least substantially completely filled with oil that extends to and at least substantially fills said pressure chamber whereby the pressure of a body of liquid in which said housing is immersed is transmitted to said switch unit through such oil.

5. In combination in a control for an electrically driven sump pump, or the like, a housing having a bottom cap with a downwardly open recess therein secured thereto, a pressure actuated switch unit positioned within said housing and including a pressure chamber having a tube connecting thereto and extending therefrom for receiving a fluid switch actuating pressure medium, lead means extending through said housing in sealed relation thereto and connecting to said switch unit, an oil impervious flexible diaphragm secured to said housing and extending over said recess to form a compartment therewith, said bottom cap having a bore extending from said recess to the upper margin of such bottom cap, said tube extending downwardly into said bore, and means forming a sealed connection between said bore and said tube, said compartment and pressure chamber being completely filled with a continuous liquid oil body whereby the pressures of a body of liquid in which said housing is immersed is transmitted to said switch unit that is isolated from such body of liquid, said oil being lighter in weight than said liquid retained in said compartment even upon failure of said diaphragm.

References Cited by the Examiner

UNITED STATES PATENTS 2,922,002    1/60    Gilman                200—83
2,985,732    5/61    Russell                200—81

BERNARD A. GILHEANY, *Primary Examiner.*